United States Patent
Sartori et al.

(10) Patent No.: US 8,617,440 B2
(45) Date of Patent: Dec. 31, 2013

(54) POLYETHYLENE COMPOSITION FOR STRETCHED TAPE PRODUCTS

(75) Inventors: Franco Sartori, Ferrara (IT); Siegfried Grabowski, Usingen (DE)

(73) Assignee: Basell Polyolefine GmbH, Wesseling (DE)

( * ) Notice: Subject to any disclaimer, the term of this patent is extended or adjusted under 35 U.S.C. 154(b) by 859 days.

(21) Appl. No.: 12/087,944

(22) PCT Filed: Jan. 9, 2007

(86) PCT No.: PCT/EP2007/050177
§ 371 (c)(1),
(2), (4) Date: Jul. 17, 2008

(87) PCT Pub. No.: WO2007/082817
PCT Pub. Date: Jul. 26, 2007

(65) Prior Publication Data
US 2009/0008824 A1    Jan. 8, 2009

Related U.S. Application Data

(60) Provisional application No. 60/762,977, filed on Jan. 27, 2006.

(30) Foreign Application Priority Data

Jan. 19, 2006 (EP) .................................... 06001163

(51) Int. Cl.
*D02J 1/22* (2006.01)
*C08L 23/06* (2006.01)

(52) U.S. Cl.
USPC .......................... 264/146; 264/289.3; 525/240

(58) Field of Classification Search
USPC .......................................... 525/240; 524/528
See application file for complete search history.

(56) References Cited

U.S. PATENT DOCUMENTS

| | | | |
|---|---|---|---|
| 4,010,127 A | 3/1977 | Taka et al. | 260/23 |
| 4,657,982 A * | 4/1987 | Breck et al. | 525/240 |
| 5,242,922 A | 9/1993 | Shirodkar | 524/528 |

FOREIGN PATENT DOCUMENTS

| | | |
|---|---|---|
| DE | 2546237 | 10/1975 |
| EP | 2814761 | 10/2000 |
| EP | 1 469 104 A1 | 4/2003 |
| JP | 50143847 | * 11/1975 |
| JP | 51133366 | * 11/1976 |
| WO | WO 95/16743 | 6/1995 |
| WO | WO 2004/092459 | 10/2004 |
| WO | PCT/EP2007/050177 | 1/2007 |

OTHER PUBLICATIONS

JP51133366_English Abstract, Mar. 31, 2010.*
JP50143847_English Abstract, Mar. 31, 2010.*

* cited by examiner

*Primary Examiner* — Philip Tucker
*Assistant Examiner* — Vicki Wu

(57) ABSTRACT

A polyethylene composition, in particular suitable for the preparation of monofilaments, mono-tapes and stretched tapes, is described. The polyethylene composition of the invention comprises 95.1%-99.5% by weight of polyethylene having a density above 0.930 g/cm³ and a polydispersity $M_w/M_n$ from 2.0 to 5.9, and 4.9%-0.5% by weight of polybutene. The bubble stability and the me-chanical properties of the films prepared from this composition are advantageously improved. The use of a polyethylene composition comprising 90.0%-99.5% by weight of polyethylene having a density above 0.930 g/cm³, and 10.0%-0.5% by weight of polybutene, for preparing monofila-ments, monotapes or stretched tapes is also described.

6 Claims, No Drawings

POLYETHYLENE COMPOSITION FOR STRETCHED TAPE PRODUCTS

CROSS-REFERENCE TO RELATED APPLICATIONS

This application is the U.S. national stage under 35 U.S.C. §371 of International Application PCT/EP2007/050177, filed Jan. 9, 2007, claiming priority to European Patent Application No. 06001163.2, filed Jan. 19, 2006, and provisional U.S. Appl. No. 60/762,977, filed Jan. 27, 2006; the disclosures of International Application PCT/EP2007/050177, European Patent Application 06001163.2, and provisional U.S. Appl. No. 60/762,977, each as filed, are incorporated herein by reference.

FIELD OF THE INVENTION

The present invention relates to a novel polyethylene composition, in particular suitable for monofilament, monotape and stretched tape applications, to a film comprising such a composition, as well as to the use of a polyethylene composition for preparing textile articles starting from filaments, monotapes or stretched tapes, for example to manufacture artificial grass, nets, geotextiles, ropes, yarns, fabrics, tarpaulins and bags. The present invention also relates to these articles comprising a polyethylene composition and to a process for preparing these articles with a polyethylene composition.

In the present description and in the following claims, the term "monofilaments" is used to indicate uniaxially oriented wire-like polymer strands having a substantially circular cross section. Monofilaments are manufactured by melt spinning process and their size ranges from 50 μm to 1.0 mm in diameter, depending on the end use application.

For the purpose of the present description and of the claims which follow, except where otherwise indicated, all numbers expressing amounts, quantities, percentages and so forth, are to be understood as being modified in all instances by the term "about". Also, all ranges include any combination of the maximum and minimum points disclosed and include any intermediate ranges therein, which may or may not be specifically enumerated herein.

In the present description and in the following claims, the term "monotape" is intended to indicate a tape having a cross-section which is tapered outwards so as to define a thicker portion in the axially inner part and two thinner portions in the axially outer parts of the cross-section.

In the present description and in the following claims, the term "tape" is intended to indicate a strip having a predetermined elongation at break, while the term "stretched tape", known in the field also with the term of raffia, is used to indicate the same strip which, following an uniaxial orientation treatment, has an elongation at break smaller than the elongation at break of the tape before orientation. As an illustrative example, a tape generally has an elongation at break higher than 100%, while the corresponding stretched tape, i.e. the tape following orientation, generally has an elongation at break lower than 100%. After orientation, the stretched tape has a reduced width and thickness with respect to the initial width and thickness of the tape before orientation. Generally, the reduction in width is greater than the reduction in thickness.

PRIOR ART

Known raw materials commonly used for manufacturing stretched tapes, monotapes, monofilaments and similar semi-finished products able to be converted into textile articles, are for example polymers such as polyethylene, polypropylene, nylon and polyesters.

As known, stretched tapes are generally prepared starting from a film produced either by a blown or by a cast film process, generally by a blown film process. The film may be cut into a plurality of tapes and then oriented or, vice versa, oriented and then cut into tapes. The orientation is carried out by stretching the film or tapes while passing through an air oven or on a hot plate at a temperature below the melting point of the material constituting the film or tape. The stretching is carried out by passing the film or tapes over a first and a second set of rollers arranged upstream and, respectively, downstream of the air oven/hot plate and operating at different speeds, the speed of the second set of rollers being higher than the speed of the first set of rollers.

The polymer which has been preferably used in the market for these applications is a high density polyethylene (HDPE) prepared with a Ziegler-Natta catalyst, said HDPE having a MFR(190/2) smaller than 1 g/10 min, such as for example Hostalen GF 7740F1, GF7740 F2, GF7740 F3, GF7750 M2 grades, commercially available from Basell. The molecular weight distribution of these polymers is quite broad, i.e. these polymers may include very long as well as very short chains.

In the present description and in the following claims, the term MFR(190/2) is used to indicate the melt flow rate according to standard ISO 1133, corresponding to a measurement performed at a temperature of 190° C. and under a weight of 2.16 kg.

Semi-crystalline polyethylene (PE) and polypropylene (PP) have also been used as raw materials for monofilaments and stretched tapes, such as disclosed for example in documents FR 2 814 761 and WO 2004/092459.

The stretched tapes, monotapes and monofilaments prepared with polyethylene exhibit greater softness and flexibility, higher elongation at break and lower tensile strength than the stretched tapes, monotapes and monofilaments prepared from other raw materials such as polypropylene. These properties are advantageous for example in the production of woven tape fabrics. The products prepared from polyethylene, however, mainly suffer from the disadvantage that the processability is inadequate, particularly in blown film applications. This disadvantage is more exacerbated when the polyethylene has a narrow molecular weight distribution, which is a desirable feature in order to maximize the tenacity.

In blown film applications, in fact, the film is prepared via blown film extrusion by forcing the polyethylene melt through an annular die. A bubble is formed which is inflated with air and hauled off at a higher speed than the die outlet speed. The bubble is intensively cooled by a current of air so that the temperature at the frost line delimiting the molten material form the solidified material is lower than the crystallite melting point. The bubble is then collapsed, trimmed if necessary and rolled up using a suitable winding means. In order to obtain a film of high and constant quality, the bubble has to be sufficiently stable so as to avoid undesired uneven thickness and creases, which are points of weakness when the film is cut into tapes and stretched.

In cast film applications, the film is prepared via flat film extrusion. In this case, the elongational viscosity of polyethylene may be insufficiently stable, thus resulting in uneven thickness of the film.

Monofilaments are prepared by extruding the polyethylene melt through a die in which a plurality of holes, normally arranged along a circular pitch, is defined. As is known, the melt is prepared by extrusion and fed to the die by means of a spinning pump. The monofilaments emerging from the die are normally subsequently subjected to quenching and oriented by stretching in a manner similar to that described above with reference to the orientation of the tapes. The need of improving the processability is felt also in the production of monofilaments.

SUMMARY OF THE INVENTION

There is thus a need for stretched tapes having a better processability in the step of forming the film by blown process or by cast process.

More in particular, the Applicant has perceived the need of ensuring that the film from which the stretched tapes are prepared has, on the one side, proper melt temperature and melt pressure and, on the other side, is manufactured at a sufficient output rate. In this way, in fact, bubble stability of such film is advantageously achieved.

It is therefore an object of the present invention that of providing monofilament, monotape or stretched tape products based on polyethylene having improved processability particularly in the blown process intended to form a film, namely in terms of bubble stability of such film, while not impairing the mechanical properties proper of polyethylene films, in particular in terms of tensile strength and elongation at break.

In the present description and in the following claims, the expression "bubble stability" is used to indicate the fact that the bubble formed during the blowing process has a regular shape in both radial and axial directions, i.e. that the bubble has, on the one side, a frost line delimiting the molten material from the solidified material which maintains a stable position in the axial direction and, on the other side, a constant diameter. Thanks to these features, the film so prepared has a constant thickness.

In other words, the bubble formed during the blowing process is able to maintain a regular shape and thickness during the blowing and subsequent solidification of the film.

Surprisingly, the Applicant has found that by adding a predetermined specific amount of polybutene to polyethylene having a density above 0.930 g/cm$^3$, it is possible to improve the processability of polyethylene, and in particular it is possible to improve the bubble stability of the blown film, thus obtaining a film with an uniform thickness at a higher output rate than in the prior art. In other words, the film from which the stretched tapes are prepared can be blown in a more effective and productive manner. At the same time, blending such a polyethylene with a predetermined specific amount of polybutene allows the mechanical properties to be maintained or improved, in particular in terms of tensile strength and elongation at break with respect to the polyethylene as such, i.e. not blended with polybutene. Advantageously, a higher stretching ratio can be attained, which results in a convenient higher tenacity and a final lower elongation at break after orientation.

In other words, the polybutene does not merely act as a processing aid, i.e. as an additive generally improving the processability at the expense of the mechanical properties: in sharp contrast, the improvement of the processability achieved by the addition of polybutene either does not substantially affect or improves the mechanical properties of the composition. So, the present invention advantageously allows to obtain a balance between processability and mechanical properties, which are normally conflicting with each other. The processability of polyethylene, in fact, may also be improved by broadening the molecular weight distribution, which necessarily results in a lower tenacity; vice versa, an improvement in tenacity of polyethylene is conventionally attained by narrowing the molecular weight distribution, which necessarily results in an inferior processability.

Such advantageous effect of improving both processability and mechanical properties is surprising in view of the known incompatibility between polyethylene and polybutene. This incompatibility is well known and exploited, for example, in heat sealed packaging, where polybutene is conventionally added to polyethylene in predetermined areas along the sealing line of the packaging in order to obtain peelability and to facilitate the opening of the packaging.

Accordingly, according to a first aspect thereof, the present invention provides a polyethylene composition, in particular intended to form films to be converted into stretched tapes or to extrude monofilaments to be converted into stretched tapes, said composition comprising:

- 95.1%-99.5% by weight of polyethylene having a density above 0.930 g/cm$^3$ and a polydispersity $M_w/M_n$ from 2.0 to 5.9, and
- 4.9%-0.5% by weight of polybutene.

In the present description and in the following claims, the term polydispersity $M_w/M_n$ is used to indicate the molar mass distribution $M_w/M_n$, in which $M_w$ is the weight average molecular weight and $M_n$ is the number average molecular weight as determined by means of gel permeation chromatography according to DIN 55672.

The determination of the values $M_n$, $M_w$ and of the molar mass distribution $M_w/M_n$ derived therefrom was carried out by means of high-temperature gel permeation chromatography on a WATERS 150 C using a method based on DIN 55672 and the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 µl injection volume, temperature: 140° C. The columns were calibrated with polyethylene standards with molar masses of from 100 to 10$^7$ g/mol. The evaluation was carried out by using the Win-GPC software of Fa. HS-Entwicklungsgesellschaft für wissenschaftliche Hard-und Software mbH, Ober-Hilbersheim.

If the predetermined specific amount of polybutene is lower than 0.5% by weight, no improvement in the bubble stability of the film obtainable starting from the composition is observed.

According to a preferred embodiment, the polyethylene composition of the invention comprises from 1.0% to 4.8% by weight of polybutene, more preferably from 1.5% to 4.5%, more preferably from 2.0% to 4.4% and, still more preferably, from 3.0% to 4.2%.

Within such preferred ranges, it is advantageously possible to obtain both an improvement of the bubble stability and of the mechanical properties of the film obtainable from the composition.

Surprisingly, within such preferred compositions, not only the bubble stability of the film is improved, but also the mechanical properties of the film are further improved with respect to the mechanical properties of films prepared starting from corresponding compositions consisting only of polyethylene and optionally of other conventional additives other than polybutene.

The density of the polyethylene of the composition of the invention is preferably in the medium and high density range, namely from 0.93 to 0.96 g/cm$^3$, more preferably from 0.940 to 0.958 g/cm$^3$ and, still more preferably, from 0.940 to 0.950 g/cm$^3$.

In the present description and in the following claims, the expression "medium density polyethylene" (MDPE) is used to indicate a polyethylene having a density ranging from above 0.930 to 0.940 g/cm³, while the expression "high density polyethylene" (HDPE) is used to indicate a film having a density above 0.940 g/cm³, for example from 0.940 g/cm³ to 0.960 g/cm³.

According to a preferred embodiment of the invention, the polyethylene comprises a MDPE or a HDPE prepared by means of a Ziegler-Natta catalyst. According to an alternative preferred embodiment, the polyethylene comprises a MDPE or a HDPE prepared by means of a metallocene catalyst.

According to a preferred embodiment of the invention, the polyethylene comprises a multimodal polyethylene including a plurality of ethylene polymer fractions having distinct molecular weights.

In this way, the composition of the invention, on the one side, may have a broad molecular distribution, which advantageously permits to further improve the processability of the composition. Furthermore, thanks to the fact that the multimodal first polyethylene component of the invention includes a plurality of ethylene polymer fractions having distinct comonomer contents, the composition of the invention, on the other side, may be tailored in such a way to preferentially include relatively greater amounts of comonomer within the relatively higher molecular weight fractions, and relatively smaller amounts of comonomer within the relatively lower molecular weight fractions, as described above with reference to further preferred embodiments, which advantageously permits to improve the mechanical properties of the composition, and in particular the puncture resistance as well as the tensile and tear strength of the film products prepared therefrom.

According to a preferred embodiment of the invention, the polyethylene comprises a bimodal polyethylene including a relatively low molecular weight ethylene polymer and a relatively high molecular weight ethylene polymer.

This results in an advantageously broadening of the molecular weight distribution, which in turn advantageously allows to prepare films having an improved processability while maintaining adequate mechanical properties.

Preferably, the bimodal polyethylene includes a relatively low molecular weight ethylene homopolymer and a relatively high molecular weight ethylene copolymer.

In this way, the mechanical properties of the film obtainable from the composition are further improved.

Preferably, the high molecular weight ethylene copolymer comprises a predetermined quantity by weight of at least one comonomer, which is preferably selected from the group comprising propene, 1-butene, 1-pentene, 1-hexene, 4-methyl-1-pentene, 1-heptene, 1-octene and 1-decene and combinations thereof.

More preferably, the high molecular weight ethylene copolymer comprises up to 10% by weight, preferably from 0.5% to 10% by weight, of at least one comonomer, more preferably 0.5% to 5% by weight of at least one comonomer, in both cases the comonomer(s) being preferably selected from the above-mentioned list of preferred comonomers.

By way of illustrative example, if the comonomer is 1-butene, the high molecular weight ethylene copolymer comprises less than 2% by weight of 1-butene, more preferably 0.5% to 1.5% by weight of 1-butene.

According to a preferred embodiment of the invention, the multimodal polyethylene is prepared by polymerizing ethylene in a respective plurality of reactors arranged in series with each other. In this case, a corresponding plurality of polymerization stages is carried out in a serial mode, and the result of the different subsequent polymerization stages is a multimodal polyethylene composition.

According to an alternative embodiment of the invention, the multimodal polyethylene is prepared by means of a mixed type catalyst, i.e. a catalyst comprising particles each containing a plurality of distinct active species. In this way, it is advantageously possible to prepare the polyethylene by means of a polymerization process carried out in a single reactor. When the mixed type catalyst contains only two active species, for example, a bimodal polyethylene may be advantageously obtained, which permits, on the one side, to prepare a broad molecular weight distribution composition and, on the other side, to polymerize both the relatively low molecular weight component and the relatively high molecular weight component in a parallel way, i.e. substantially in a simultaneous manner, in one single reactor.

Alternatively, the at least two distinct active catalytic species are incorporated in different catalyst particles. Also in this case, by providing a mixture of at least two particulate catalysts, a corresponding plurality of polymerization stages is advantageously carried out in a substantially simultaneous manner in a parallel mode and the result of the different substantially simultaneous polymerization stages is a multimodal polyethylene composition.

Preferably, the polyethylene has a MFR(190/5) lower than 5.0 g/10 min.

Advantageously, in this way it is possible to obtain a composition which is particularly suitable for forming stretched tapes intended to manufacture artificial grass.

In the present description and in the following claims, the term MFR(190/5) is used to indicate the melt flow rate according to standard ISO 1133, corresponding to a measurement performed at a temperature of 190° C. and under a weight of 5 kg.

The polyethylene has preferably a MFR(190/5) from 1.5 g/10 min to 5.0 g/10 min, more preferably lower than 3.5 g/10 min and, still more preferably, from 1.5 g/10 min to 2.5 g/10 min.

Within such preferred ranges of melt flow rate, it is advantageously possible to obtain a composition which is particularly suitable for forming stretched tapes intended to manufacture round bale netting.

Still more preferably, the polyethylene has preferably a MFR(190/5) lower than 2.5 g/10 min. According to a further preferred embodiment of the invention, the polyethylene has a MFR(190/5) from 0.5 g/10 min to 2.5 g/10 min, more preferably from 0.5 to 2.0 g/10 min.

Advantageously, the processability of the polyethylene is in this way further improved.

Preferably, the polyethylene has a FRR(21/5) lower than 20, preferably from 10 to 18, more preferably lower than 15 and, still more preferably, from 2 to 9.

In the present description and in the following claims, the term FRR(21/5) is used to indicate the flow rate ratio, that is the ratio between MFR(190/21) and MFR(190/5).

If the polyethylene has a FRR(21/5) lower than 20, in particular from 12 to 20, it is advantageously possible to obtain a composition which is particularly suitable for forming stretched tapes intended to manufacture artificial grass, while if the polyethylene has a FRR(21/5) lower than 12, it is advantageously possible to obtain a composition which is particularly suitable for forming stretched tapes intended to manufacture round bale netting.

Preferably, the polyethylene has a typical intrinsic viscosity between 1.5 to 3 dl/g in decalin at 135° C., as determined by EN ISO 1628-3:2003.

The polybutene has preferably a MFR(190/2) from 1 g/10 min to 200 g/10 min, more preferably from 1 g/10 min to 50 g/10 min and, still more preferably, from 1 g/10 min to 10 g/10 min.

Preferably, the polybutene is a homopolymer 1-polybutene.

According to a preferred embodiment of the invention, the homopolymer 1-polybutene has a MFR(190/2) from 3 to 6 g/10 min, more preferably from 3.5 to 5 g/10 min.

According to a further preferred embodiment, the 1-polybutene is a random copolymer, preferably having a MFR(190/2) from 2 to 5 g/10 min, more preferably from 3 to 4 g/10 min.

The polybutene is preferably a copolymer of butene comprising at least one comonomer selected from the group comprising ethylene, propylene, 1-pentene, 1-hexene, 4-methyl-1-pentene, 1-heptene, 1-octene and 1-decene and combinations thereof.

Preferably, the 1-polybutene copolymer comprises 1 to 15% by weight of at least one comonomer, preferably selected from the above-mentioned group.

For example, if the comonomer is ethylene, the 1-polybutene copolymer preferably comprises 1 to 4% by weight of ethylene.

Preferably, the polyethylene composition has a density from 0.929 g/cm$^3$ to 0.960 g/cm$^3$, more preferably from 0.940 g/cm$^3$ to 0.958 g/cm$^3$, more preferably from 0.940 g/cm$^3$ to 0.950 g/cm$^3$ and, still more preferably, from 0.942 g/cm$^3$ to 0.946 g/cm$^3$.

According to a second aspect thereof, the present invention relates to the use of a polyethylene composition comprising:
- 95.1%-99.5% by weight of polyethylene having a density above 0.930 g/cm$^3$ and
- 4.9%-0.5% by weight of polybutene, for preparing a film. The invention also relates to a film having such features.

Preferably, the polydispersity of the polyethylene $M_w/M_n$ is from 2 to 10, more preferably from 2.0 to 5.9 and, still more preferably, from 3.0 to 5.9.

According to further preferred embodiments, such a polymer composition for the preparation of a film and the film prepared therefrom have the preferred features described above with reference to the first aspect of the invention.

Advantageously, the film of the invention has a substantial constant thickness all over the surface thereof, i.e. a thickness whose variations are lower than 10% of the average thickness of the film also at a higher output rate, which may be up to 80-95 kg/h.

The present invention also relates in particular to a blown or cast film having the above-mentioned features.

The present invention also relates to the use of a polyethylene composition comprising:
- 90.0%-99.5% by weight of polyethylene having a density above 0.930 g/cm$^3$, and
- 10.0%-0.5% by weight of polybutene, for preparing monofilaments, monotapes or stretched tapes.

If the predetermined specific amount of polybutene is lower than 0.5% by weight, no improvement in the bubble stability is observed. If the predetermined specific amount of polybutene is higher than 10% by weight, a worsening of the mechanical properties of the polyethylene is observed. Preferably, the composition comprises 95.1%-99.5% by weight of polyethylene and 4.9%-0.5% of polybutene. According to further preferred embodiments, for the above-mentioned use a polyethylene composition may be envisaged which comprises from 1.0% to 4.8% by weight of polybutene, more preferably from 1.5% to 4.5%, more preferably from 2.0% to 4.4% and, still more preferably, from 3.0% to 4.2%.

By way of illustrative example, the polyethylene composition so defined is suitable for preparing textile articles such as artificial grass, round bale netting, geotextiles for embankment protection, ropes, yarns, fish nets, shade and windbreak clothes, filter fabrics, tarpaulins, packaging tubes, flexible bulk containers, agricultural bags, shadow nets, scaffolding nets, bird protection nets.

Accordingly, the present invention also relates to monofilaments, monotapes or stretched tapes, as well as to articles, such as for example those listed above, which can be manufactured from the monofilaments, monotapes or stretched tapes.

The present invention also provides a process for preparing monofilament, monotape and stretched tape products with a polyethylene composition, said process comprising the steps of:
a) providing a polyethylene composition including:
  90.0%-99.5% by weight of polyethylene having a density above 0.930 g/cm$^3$, and
  10.0%-0.5% by weight of polybutene,
b) producing a film from said polyethylene composition,
c) cutting said film into a plurality of tapes, and
d) orienting said plurality of tapes, preferably by stretching.

The polybutene is preferably added to the polyethylene in line by means of a gravimetric or volume dosing system in the hopper or, alternatively, through a precompound by means of a conventional extruder system.

Alternatively, the film can be first oriented by stretching and then cut into tapes. In such case, the orientation step is carried out on the film and the cutting step is carried out on the oriented film. In other words, in such alternative embodiment the process comprises the steps of:
a) providing a polyethylene composition including:
  – 90.0-99.5% by weight of polyethylene having a density above 0.930 g/cm$^3$, and
  – 10.0%-0.5% by weight of polybutene,
b) producing a film from said polyethylene composition,
c) orienting said film, preferably by stretching, and
d) cutting said oriented film into a plurality of tapes.

According to a preferred embodiment of the process of the invention, the process may comprise two orientation steps, namely a first orientation step, in which the film is oriented, preferably by stretching, and, following a step of cutting the oriented film, a second orientation step, in which the plurality of tapes formed by cutting are further oriented.

Regardless of the specific embodiment of the process of the invention, the film produced in step b) can be either a blown film or a cast film. The film production is easier and the productivity is higher with a processed composition such as that including polyethylene and polybutene as defined above with reference to the first aspect of the invention.

In the production of blown films, the resins prepared with the composition of the invention provide a very stable bubble, thereby leading to films having a constant and uniform thickness and presenting no or very little creases.

It is further observed that blown or cast films maintain good mechanical properties, such as tensile strength and tenacity.

The orientation of the film and/or of the tapes cut therefrom is preferably carried out by stretching. The stretching is preferably performed by means of at least one stretching unit. The stretching unit preferably comprises a heating means, such as for example an air oven or a hot plate, at least one roller arranged upstream of the heating means and at least one roller arranged downstream of the heating means, the at least one first roller and the at least one second roller being able to be driven at different speeds, namely at a first speed and, respectively, at a second speed.

So, for example, orientation of the film and/or of the tapes cut therefrom is preferably performed by stretching the film or, alternatively, the tapes, by means of the rollers driven at different speeds—the at least one second roller being operated at a speed higher than the speed of the at least one first roller—while passing through the heating means maintained at a temperature below the melting temperature of the polyethylene composition. If an oven is used, hot air is blown in the oven, preferably counter current of the movement of the film/tapes, and preferably at a flow rate such as to enable fast and uniform heating.

The stretching unit may alternatively comprise at least two set of rollers arranged upstream and, respectively, downstream of the heating means operable at different speeds. The second set of rollers is operated at a speed higher than the speed of the first set of rollers.

The stretching of tapes is preferably performed by means of such stretching unit comprising two sets of rollers.

The stretching is carried out with a predetermined stretching ratio S.R. defined by the ratio of the speed of the second roller (or of the second set of rollers) to the speed of the first roller (or of the second set of rollers). The stretching ratio is preferably higher than 1.

The stretching at high temperature, for example in the range 60° C.-120° C., results in chain/crystals orientation with a simultaneous increase of crystallinity. These structural changes lead to an increase of tensile strength and, at the same time, to a reduction of elongation. The tensile strength increases with increasing stretching ratio and with increasing stretching temperature.

It is preferred that the stretching temperature is as close as possible to but smaller than the melting temperature. For polyethylene compositions having a density above 0.930 g/cm$^3$, preferred values for the stretching ratio are of from 2-10 depending on the final application of the composition and in particular on the required properties of the articles to be manufactured from the composition.

The typical stretching temperatures depend on the melting temperature of the polyethylene composition: such temperatures must be lower than the melting temperature. Preferably, the stretching temperatures are from 60° C. to 100° C.

Preferably, the stretched tapes are annealed immediately after the stretching operation in order to minimize shrinkage which could occur as a result of residual stresses in the stretched tapes. Annealing is preferably done by heating the stretched tapes while these are being transferred from the at least second roller onto at least one third roller (or onto a third set of rollers) having a third speed which is smaller than the speed of the second roller (or of the second set of rollers). Preferably, the third speed is about 5% of the second speed. The annealing is preferably performed at a temperature slightly inferior to the stretching temperature. Preferably, the annealing temperature is from 5° C. to 20° C. lower than the stretching temperature.

Polymers which do not include either very long linear chains or long chain branched molecules have a better stretchability. For example, the linear polyethylene chains usually obtained with a Ziegler-Natta catalyst have a high degree of stretchability.

The present invention will be further described by means of the following preferred embodiments without restricting the scope of the invention.

PREFERRED EMBODIMENTS OF THE INVENTION

Three polyethylene compositions have been tested for preparing stretched tapes according to the following examples.

Example 1

Comparison

A first polyethylene P1 was a commercial bimodal high density polyethylene resin prepared by polymerizing ethylene in two reactors arranged in series with each other in the presence of a Ziegler-Natta catalyst system: (Hostalen GF7740 F3, available from Basell). P1 had a density of 0.946 g/cm$^3$, a MFR(190/5) of 1.8 g/10 min and a MFR(190/2) of 0.5 g/10 min. The polyethylene P1 was granulated.

Example 2

Invention

A polyethylene composition P2 according to the invention was prepared by adding to the powder granulated polyethylene of Example 1 a commercial random 1-polybutene (PB 8340, available from Basell) having a density of 0.89 g/cm$^3$ and a MFR(190/2) of 3.4 g/10 min. The composition consisted of 99.5% by weight of polyethylene and 0.5% by weight of 1-polybutene.

Example 3

Invention

A polyethylene composition P3 according to the invention was adding to the to the powder granulated polymer of Example 1 the 1-polybutene of Example 2. The composition consisted of 97.0% by weight of polyethylene and 3.0% by weight of 1-polybutene.

The properties of the compositions of Examples 1 to 3 are shown in the following Table 1.

TABLE 1

| | Unit | Example 1-P1 (comparison) | Example 2-P2 (invention) | Example 3-P3 (invention) |
| --- | --- | --- | --- | --- |
| MFR (190/5) | g/10 min | 1.74 | 1.76 | 1.82 |
| MFR (190/21) | g/10 min | 16.73 | 17.26 | 18.62 |
| FRR (21/5) | — | 9.61 | 9.81 | 10.23 |
| Density | g/cm$^3$ | 0.945 | 0.945 | 0.942 |

The MFR (190/5) was determined at 190° C. under a load of 5kg in accordance with ISO 1133, condition T.

The MFR (190/21) was determined at 190° C. under a load of 21.6 kg in accordance with ISO 1133, condition G.

The FRR (21/5) was the ratio between MFR (190/21) and MFR (190/5).

The density was determined in accordance with ISO 1183.

Film Extrusion

Each polyethylene composition of Examples 1-3 above was extruded into films by blown film extrusion on a blown film line manufactured by Barmag equipped with a 9E4/24D single screw extruder provided with filter package. The extruder had a screw diameter of 90 mm. The extruder had in particular a three zone screw configuration, namely including a feeding zone, a compression zone and a metering zone, with a compression ratio (i.e. the ratio between the maximum screw flight depth and the minimum screw flight depth) of 3.5:1. The extruder had a 250 mm die head with a die gap of 2 mm. The angle along which the cooling air was blown onto the extruded film was of 4°.

First tests were carried out by setting the screw speed to a predetermined speed of 50 rounds per min, which gave an output as shown in Table 2. The temperature profile of the extruder was the following: 190° C. (feeding zone), 210° C. (compression zone), 235° C. (metering zone and head), while the head and dosing temperature were both 235° C.

The blow-up ratio was 1.4:1 and the film speed at the collapsing was 16 m/10 min. The height of the frost line was of 600 mm at the set extruder speed of 50 rpm. Films with a thickness in the order of 50 μm were obtained. The extrusion properties of the different films at the set screw speed are summarized in Table 2.

TABLE 2

|  | Unit | Example 1-P1 (comparison) | Example 2-P2 (invention) | Example 3-P3 (invention) |
| --- | --- | --- | --- | --- |
| Output | kg/h | 76 | 77 | 78 |
| Melt temperature | ° C. | 279 | 277 | 273 |
| Melt pressure | bar | 209 | 202 | 190 |

Further tests were carried out on the films prepared with the compositions of Examples 1-3 with the aim of determining the maximum stretchable output and the minimum and maximum values of the stretching ratio. To this purpose, the extrusion properties of the different films at a predetermined melt temperature and at a predetermined melt pressure were determined. The results are summarized in Table 3.

TABLE 3

|  | Unit | Example 1-P1 (comparison) | Example 2-P2 (invention) | Example 3-P3 (invention) |
| --- | --- | --- | --- | --- |
| Stretchable output | kg/h | 78 | 83 | 87 |
| Melt temperature | ° C. | 280 | 280 | 278 |
| Melt pressure | bar | 210 | 207 | 198 |
| Min./Max. stretching ratio | — | 6.8/8.7 | 6.4/9.3 | 6.1/9.3 |

No bubble instability problems were observed in the films according to the invention. This is shown by the higher values of stretchable output of the films prepared from the compositions P2 and P3 of the invention with respect to the stretchable output of the film prepared from the prior art composition P1. A high value of stretchable output, in turn, results in an advantageous correspondingly higher productivity at a given output.

Furthermore, the broader operative ranges within which the stretching ratio may range in the case of the compositions of the invention shows that the films of the invention are suitable for a broader class of products, from artificial grass (where a relatively lower stretching ratio is applied in order to obtain a relatively lower tenacity) to round bale netting (where a relatively higher stretching ratio is applied in order to obtain a relatively higher tenacity).

Manufacture of Stretched Tapes

Subsequently, each blown film was cut into a plurality of tapes having a width of 6 mm and a thickness of 50 μm. For this purpose, slitting tools were used comprising a plurality of blades equally spaced from one another.

The tapes were subsequently oriented by stretching. For this purpose, the tapes were fed to a series of stretching units arranged downstream of the extruder.

A first stretching unit, arranged directly downstream of the extruder comprised, in the order, three rubber coated haul-off rollers, four steel rollers for stabilizing the tapes, one rubber-coated squeeze roller and a first hot air stretching oven maintained at 130° C.

The rollers coated with rubber advantageously convey the tapes while avoiding any slip of the tapes.

A second stretching unit, arranged downstream of the first stretching unit, and in particular down-stream of the first hot air stretching oven, comprised, in the order, seven steel rollers for stabilizing the tapes, one rubber-coated squeeze roller and a second hot air stretching oven maintained at 120° C.

A third stretching unit, arranged downstream of the second stretching unit, and in particular down-stream of the second hot air stretching oven, comprised, in the order, seven steel rollers and one rubber-coated squeeze roller.

All the rollers of the three stretching units were maintained at room temperature.

The tapes were passed, in the order, over the first, second and third stretching unit.

The tapes were thus subjected to a stretching defined through a stretching ratio (S.R.) preferably from 6:1 to 9:1, where S.R. is the ratio between the speed of the rollers of the third stretching unit and the speed of the rollers of the first stretching unit.

The first stretching unit was driven at a first speed of 18 m/min, while the second and third stretching units were driven at a speed such as to achieve the values of S.R. shown in Table 4.

The finished stretched tapes had a thickness in the order of 20 μm, the specific thickness values depending on the S.R. value. As an illustrative example, a thickness of 20 μm was obtained with a S.R. of 6:1, while a thickness of 17 μm was obtained with a S.R. of 9:1.

After the orientation step as described above, the tapes were subsequently collected in a bobbin winder and the mechanical properties of the tapes were tested.

More in detail, the mechanical properties of the tapes prepared from the compositions of Examples 1-3 were measured in a standard dynamometer (Instrom 4302) with a 200 mm clamping distance, a testing speed of 100 mm/min and a temperature of 23° C. according to the standard DIN EN ISO 527. In particular, the tapes were tested as to the breaking force (N), tensile strength in (mN/tex) and elongation at break (%). The mechanical properties measured at S.R. of 6, 7, 8 and 9 are shown in Table 4.

TABLE 4

|  | Unit | S.R. | Example 1-P1 (comparison) | Example 2-P2 (invention) | Example 3-P3 (invention) |
| --- | --- | --- | --- | --- | --- |
| Titre | tex | 6:1 | — | 60 | 62 |
| Breaking force | N | 6:1 | — | 24 | 24 |
| Tensile strength | mN/tex | 6:1 | — | 404 | 396 |
| Elongation at break | % | 6:1 | — | 51 | 56 |
| Titre | tex | 7:1 | 52 | 54 | 52 |
| Breaking force | N | 7:1 | 24 | 25 | 24 |
| Tensile strength | mN/tex | 7:1 | 466 | 467 | 480 |

TABLE 4-continued

| | Unit | S.R. | Example 1-P1 (comparison) | Example 2-P2 (invention) | Example 3-P3 (invention) |
|---|---|---|---|---|---|
| Elongation at break | % | 7:1 | 30 | 40 | 35 |
| Titre | tex | 8:1 | 46 | 48 | 46 |
| Breaking force | N | 8:1 | 27 | 28 | 27 |
| Tensile strength | mN/tex | 8:1 | 590 | 587 | 600 |
| Elongation at break | % | 8:1 | 24 | 23 | 23 |
| Titre | tex | 9:1 | — | 45 | 41 |
| Breaking force | N | 9:1 | — | 30 | 29 |
| Tensile strength | mN/tex | 9:1 | — | 659 | 699 |
| Elongation at break | % | 9:1 | — | 21 | 17 |

The titre in tex gives the weight (g) of a length of 1000 m and is a measure of the linear mass of a filament or fiber.

The stretched tapes had a high breaking force, tensile strength, and elongation at break. They also had a soft touch and a high flexibility.

The higher was the S.R., the stronger was the increase of the tensile strength, the elongation at break still having adequate values.

The invention claimed is:

1. A polyethylene composition comprising:
   (a) 95.1%-99.5% by weight of polyethylene having a density above 0.930 g/cm$^3$ and a polydispersity $M_w/M_n$ from 2.0 to 5.9, wherein the polyethylene has a MFR (190/5) from 1.5 g/10 min to 5.0 g/10 min; and
   (b) 4.9%-0.5% by weight of polybutene which has a MFR (190/2) from 1 g/10 min to 10 g/10 min.

2. The polyethylene composition according to claim 1, wherein the density of the polyethylene (a) is from 0.940 to 0.960 g/cm$^3$.

3. The polyethylene composition according to claim 2, wherein the polyethylene (a) has a MFR(190/5) lower than 3.5 g/10 min.

4. The polyethylene composition according to claim 1, wherein the polybutene is a homopolymer 1-polybutene.

5. The polyethylene composition according to claim 1, wherein the polybutene is a copolymer of butene comprising at least one comonomer selected from the group of ethylene, propylene, 1-pentene, 1-hexene, 4-methyl, 1-pentene, 1-heptene, 1-octene and 1-decene and combinations thereof 6. Film comprising the polyethylene composition of claim 1.

* * * * *